United States Patent Office 3,411,926
Patented Nov. 19, 1968

3,411,926
JOINT CEMENT
Jack L. Gogek and Donald L. Wilhelm, Decatur, Ill., assignors to A. E. Staley Manufacturing Company, Decatur, Ill., a corporation of Delaware
No Drawing. Filed Aug. 1, 1966, Ser. No. 569,091
10 Claims. (Cl. 106—210)

ABSTRACT OF THE DISCLOSURE

A wallboard joint cement comprising a major portion of a wallboard joint cement filler and a minor portion of a cement binder comprising between about 51 and 75% by weight of gelatinized oxidized starch material and between about 25 and 49% by weight of non-gelatinized starch material.

---

This invention is directed to compositions useful in wallboard joint cements and to a process for producing such cements.

A wallboard joint cement is used in dry wall construction to give a wall a continuous, finished appearance. In most dry wall construction pre-cut, rectangular sections of wallboard are fastened in abutting relation to a frame to form a substantially flat wall. The spaces or cracks unavoidably created by the abutting sections are then filled with a wet joint cement, allowed to dry, and sanded to give a smooth uniform appearance. A preferred mode of operation is to first fill the spaces or joints between the wallboard with a cement having an overlap spread of several inches. A perforated strip is then placed over the cement and additional cement applied. The cement is smoothed, allowed to dry, and then sanded to a smooth uniform appearance.

The joint cements most generally used are available as a dry mixture and comprise a major portion of an inert filler and a minor portion of a binder.

The filler portion of the cement is generally an inert material such as asbestos, mica, limestone, clay, silica and the like. Generally, two or more of the above materials are used with clay or limestone making up the major filler ingredient. The binder portion of the cement is the more important of the two and normally consists of a protein such as casein. Various animal glues, natural gums, and polymeric resins have also been used to some degree.

As previously mentioned, the joint cement is generally available as a dry mix. When the cement is to be used, it is mixed with water until the most desirable working consistency or viscosity is obtained. The particular cement consistency or viscosity depends on the personal preference of the user and on whether the cement will be manually or machine applied.

One of the disadvantages associated with the joint cements presently being used is that the joint cement tended to crack or form hairline splits along its surface during or a short time after the cement had dried and hardened. In some instances these cracks appeared after the wall had been painted or textured thus adding to the cost and complexity of repair. These surface cracks have been attributed to the differential movement of the tape, cement, or wallboard during the period of drying. However the major cause for cracking is attributed to shrinkage which occurs during the hardening or drying process.

Another disadvantage associated with joint cements now in use and particularly with joint cements which utilize casein as the binder is that, after the dry cement powder has been wetted with water, a waiting period of approximately one hour is required to insure complete dispersion of the casein in the water. Further, if the casein is not properly dispersed in the cement, lumping, poor adhesion, and cracking of the cement can occur. Still another problem associated with cement compositions presently being used is that the binder material in the cement has a tendency to migrate to the surface of the cement during the drying and hardening process. This causes crusting and excessive hardening of the surface layer and makes even sanding of the cemented area and the wallboard extremely difficult. Still another problem related to particle migration is surface discoloration. Discoloration of the cemented area is particularly prevalent in areas of high humidity and has been found to occur from several months to several years after the cement has been applied.

Particle migration, however, can be controlled if not remedied by mixing smaller amounts of water with the dry joint cement. For all practical purposes though, the amount of water added cannot be varied too much from what is considered a trowelable viscosity without effecting the ease and quality of cement application.

It is therefore an object of this invention to provide a cement which exhibits improved joint cement characteristics and which avoids the disadvantages associated with binding materials previously used in the art.

Another object of this invention is to provide a joint cement which has improved troweling characteristics and which exhibits improved adhesion to the wallboard.

Another object of this invention is to provide a dry joint cement which exhibits improved adhesion and sandability properties, and which exhibits an improved resistance to color bleeding and surface cracking.

Another object of this invention is to provide a binder composition for joint cements which is compatible and complementary with the filler portion of cement.

Still another object of this invention is to provide a dry joint cement having a binder which is economical and readily available on the open market.

A more particular object of this invention is to provide a wallboard joint cement having the following combined characteristics.

(1) Good adhesion to a wallboard and to a perforated tape.
(2) Resistance to color bleeding.
(3) Improved sandability.
(4) Good crack resistance.
(5) Low water demand in arriving at a trowelable viscosity.
(6) Long pot life.
(7) Negligible shrinkage of the dried and hardened cement.

These and other objects of this invention will be more readily apparent from the detailed description and discussion which follows.

It was unexpectedly found that these and other objects of this invention can be accomplished by utilizing a particular type of starch material as a binder in the joint cement. The starch material used as a binder in the composition of this invention may be broadly described as gelatinized, oxidized starch capable of exhibiting binding characteristics in a cement filler.

Oxidized starches may be obtained by a number of oxidizing techniques whereby a starch material is contacted with an oxidizing agent under oxidizing conditions.

For example, the oxidation of a starch material may be accomplished by the use of hydrogen peroxide; hypohalites; periodic acid; $\alpha, \alpha'$ bis (azobutyronitrile); potassium persulfate; and many others. A more complete discussion on the oxidation of starches can be found in Kerr's "Chemistry and Industry of Starch," 2nd edition, 1950, pages 325–343.

Although the techniques employed in oxidizing starches are well known, practically nothing is known of the chemical changes which the starch molecule or, more particularly, the starch granule undergoes during oxidation. The poly functional nature of the starch molecule and the complex arrangement of such molecules into the highly organized starch granules makes the understanding of starch oxidation extremely difficult.

However, for purposes of this invention it has been found that starch granules oxidized by the use of various hypohalites, and particularly by the use of sodium hypochlorite, will produce a binder material best suited for use in wallboard joint cement. However, it should be understood that other oxidizing agents may also be used to produce a satisfactory joint cement. The use of a hypochlorite bleach and particularly a sodium hypochlorite bleach prepared by adding liquid chlorine to 18° Bé. (about 4 N) sodium hydroxide until a 0.9 N solution (based on the unused alkali) is obtained is a particularly effective starch oxidizing agent. Since the above bleach contains 9% active chlorine, it is generally referred to as a "9 titer bleach." A more complete discussion on hypochlorite bleaches and conditions for obtaining an oxidized storch can be found in Starch Chemistry and Technology, volume 1, pages 474–478 by Whistler and Paschall.

Oxidized starches for use in this invention can be further identified as a starch containing a certain concentration of carboxyl groups based on the total weight of the starch granules. It should be understood, however, that the starch molecule may also contain partially oxidized groups such as an aldehyde or ketone group in addition to the carboxyl groups. Irrespective of the presence of aldehyde or ketone groups or for that matter other non-interfering groups, the starch material will have a carboxyl content of greater than 0.1% based on the weight of the starch material. Generally the starch material will have a carboxyl content of between 0.2% and 1.3%. However, in instances where the joint cement contains other additives such as thickening agents, the carboxyl content of the starch material may be greater than 1.3% and at times can be as high as 4.3% based on the dry weight of the starch.

Oxidized granular starch may be gelatinized or pasted by numerous methods well known in the art. The best known and probably the simplest of all gelatinization methods comprises heating a suspension of the starch in water (frequently under slightly alkaline conditions), to the gelatinization temperature of the starch. (Gelatinization of the starch material is indicated when the starch material granule begins to swell and the starch is considered to be gelatinized when it has lost its characteristic birefringence. The starch suspension further becomes less opaque and the solubility of the starch in water is increased. Following gelatinization, the starch material can be dried by conventional drying means such as spray drying or roll drying methods.

A particular method for obtaining a gelatinized starch for use in this invention may be found in United States Patent 3,137,592. This patent discloses a method for gelatinizing a starch material comprising mechanical working or shearing of a mixture of a starch raw material with a minor proportion of a plasticizer at an elevated temperature and a pressure above atmospheric. The starch product is extruded into an area of reduced pressure, preferably atmospheric, and at a temperature below working temperature. This causes flashing of the plasticizer and other volatile materials from the starch extrudate. The extrusion process is generally conducted at a temperature of between 150° and 160° C. at pressures of between 500 and 12,000 p.s.i. or greater. During the extrusion process of the patent there is an adiabatic temperature increase of at least 50° C. In some instances the temperature rise may be higher than that desired so that artificial cooling is necessary.

The above patent discloses that water is the preferred starch-swelling agent or plasticizer for the starch raw material; however, other suitable plasticizers such as formamide, ethylene diamine, dimethyl sulfoxide, pyrrolidine, urea, piperazine, glycerol, ethylene glycol, sorbitol, propylene glycol, chloral hydrate, and dimethyl formamide may be used. Mixtures of two or more of these plasticizers may also be used. Preferably, the plasticizer will have boiling point at or slightly above 100° C. It is generally preferred that the starch plasticizer be an inert material, that is one that does not hydrolyze, oxidize, derivatize or otherwise react chemically with the starch raw material under extrusion conditions. When water is used as plasticizer or starch-swelling agent, it is generally present in an amount of between 22% and 67% by weight of the dry starch raw material. However, it has been found possible under other conditions to use as low as 10% and as high as 75% by weight of the dry starch raw material.

The starch raw material is generally extruded (worked) at temperatures below 300° C. and preferably within a range of between 100° C. and 250° C. The extrusion process generally takes place at pressures below 20,000 p.s.i. and preferably between 500 and 5,000 p.s.i. The extrusion process may be accomplished with any conventional type plastics extruder.

It has been found an oxidized starch extrudate, that is an oxidized starch material gelatinized by an extrusion process of the type described provides a starch material having overall properties best suited for use as a binder material in the joint cements of this invention.

The use of an extruder further provides a convenient way for oxidizing and gelatinizing a starch material in a single operation. Example 19 of U.S. Patent 3,137,592 describes such an operation. In a particular embodiment of this invention the preferred binder material can be characterized as a hypohalite oxidized starch extrudate having a cold water solubility of greater than 50% at 25° C., and a viscosity of less than 50 centipoises when 10 parts of the starch extrudate are combined with 90 parts water.

The joint cement of this invention comprises a major portion of an inert filler and a minor portion of a binder material comprising a gelatinized oxidized starch material.

Normally the binder material will be present in the joint cement in an amount of less than 20% based on the total weight of the cement. Preferably though, the binder material is present in the cement in an amount of between about 0.2% and 15%. Where the cement binder is a halogen-oxidized starch extrudate, the starch material is normally present in the cement in an amount of between about 1% and 10% based on the total weight of the cement. Amounts of between about 3% and 7% are, however, generally preferred. Under special circumstances and particularly if other materials are present in the binder of the joint cement, larger amounts and possibly even lesser amounts of the gelatinized oxidized starch material may be used.

In one preferred embodiment of this invention, a binder composition containing partially gelatinized starch that is a composition containing a major proportion of a gelatinized oxidized starch material and a minor proportion of non-gelatinized oxidized starch material has been found to exhibit exceptionally good binding characteristics when combined with cement filler. A cement binder composition wherein about 51% and 75% of the composition is a gelatinized oxidized starch material and between about 25% and 49% of the composition is non-gelatinized oxidized starch material based on the total weight of the binder composition has produced good results. A cement binder wherein the gelatinized oxidized starch material and the non-gelatinized starch are present in a weight ratio of about 2:1 is, however, preferred. A partially gelatinized starch can be conveniently obtained by controlling the degree of starch gelatinization.

When about 5 weight percent to 10 weight percent of a binder material comprising a 2:1 ratio of gelatinized oxidized starch and a non-gelatinized oxidized starch is combined with about 90% to 95% of a filler material to make up a dry joint cement composition and wetted with between about 50 parts and 100 parts water per 100 parts dry cement, a joint cement is obtained which, when applied to a wallboard and allowed to dry, can be characterized by the following properties:

(1) Good adhesion
(2) Good resistance to color bleeding
(3) Good resistance to cracking
(4) Good sandability
(5) Good trowelable viscosity
(6) Long pot life
(7) Low water demand
(8) Negligible shrinkage This composition generally exhibits characteristics which for reasons which we are not able to explain, are slightly better than the characteristics exhibited by a cement containing only the gelatinized oxidized starch material and are substantially better than a cement containing only casein.

Generally, the amount of water added to the cement composition of this invention will vary over a wide range depending primarily on whether the cement is to be manually or machine applied and also on the personal preferance of the user. Normally though, the amount of water added to the cement will be between about 40 parts and 200 parts water per 100 parts dry cement. Preferably, the amount of water added for manual application will be between about 55 and 90 parts water per 100 parts of cement and for machine application will be between about 85 and 150 parts water per 100 parts of cement.

If the cement composition of this invention is used for wall texturing, the amount of water added may be increased to as high as 300 parts water per 100 parts dry cement and even higher if desired.

The filler portion of the joint cement is generally an inert material such as asbestos, mica, limestone, clay, silica and the like. Generally mixtures of the above materials are used with clay or limestone making up the major filler ingredient. The fillers used may, for all practical purposes, be considered as standard compositions as most all manufacturers use fillers having essentially the same major ingredients. For example, a typical filler will have its basic ingredients within the following ranges.

| | Percent |
|---|---|
| Ground limestone | 30–100 |
| Mica | 0–60 |
| Ground asbestos | 0–10 |

The above percentages are based on the total weight of filler present.

Other materials may be added to the filler, if desired, to provide an optimum balance in such properties as ease of mixing, drying rate, shrinkage, etc.

In the examples to follow, the oxidized starch material was obtained by placing 550 parts of an unmodified corn starch having a moisture content of about 12% in a Hobart mixer and adding thereto 40 parts of a 9 titer sodium hypochlorite solution diluted with sufficient water to provide the starch with a moisture content of about 25%. The reaction temperature was maintained at 130° F. until a fluidity of between 74–77 cc. was obtained. At this point, sulfuric acid was added until the starch slurry had a pH of between about 5.0 and 5.2. The starch slurry was then washed, filtered, and dried for about 24 hours at a temperature of 120° F.

The oxidized starch extrudate was obtained by utilizing a conventional screw-type plastics extruder having a long barrel cylinder of uniform bore and snug fitting rotatable screw. The barrel was constructed to withstand an internal pressure of as high as 20,000 p.s.i. The screw was rotated by a motor through an appropriate reducing gear. The screw was 62 inches long, had a diameter of 2.5 inches, and had a pitch of about 2.5 inches. The screw was rotated at about 100 r.p.m. The barrel of the extruder was equipped with four electric heating mantles controlled by a rheostat. The extruder die consisted of a cylindrical duct 0.25 inch in diameter and 6.25 inches long.

An oxidized starch made as described in the last paragraph, containing about 12% water, was introduced into the extruder with sufficient water to maintain a moisture content of about 25%. The starch was extruded as a continuous strand at a temperature of about 155° C. and a pressure of about 3,400 p.s.i. in the extruder. The retention time of the starch in the extruder was about 0.75 minute. The continuous strand was conveyed by a moving belt through a combination cooler-drier where it was cooled and dried to ambient temperature and a final moisture content of about 12%. The oxidized starch strands were crushed to pass through a 60 mesh screen with fines of less than 325 mesh being discarded.

Example 1

A joint cement was prepared by blending five grams of a gelatinized oxidized starch having a carboxyl content of 0.54 weight percent with 95 grams of a base mix consisting of

| | Parts |
|---|---|
| # 400 asbestos fiber | 10.0 |
| China clay (kaolin) | 5.0 |
| Surfex (ground limestone) | 74.8 |
| Mica 3X | 10.0 |
| Sodium carbonate (soda ash) | 0.3 |

The above mixture was blended in a Blendette mixer for a period of about 10 minutes. The blended mixture was transferred to a 400 ml. beaker and 66 ml. of distilled water added. The mixture was stirred until the joint cement was thoroughly wetted and allowed to stand for thirty minutes. The wet cement had a trowelable viscosity of between 160,000 to 170,000 cps. as measured on a RVF Brookfield viscometer mounted on a Helipath stand at 2 r.p.m. using a Helipath bar-type spindle E.

An evaluation of the above prepared joint cement as well as a description of the tests used in evaluating the cement are as follows:

(1) Application pot life.—The wet cement was placed in a closed container for 24 hours. The viscosity was rechecked after the 24-hour period.

Result.—No measurable change in viscosity was noted.

(2) Crack resistance.—A ⅛ inch wet thickness of cement was placed on the surface of a 4 x 6 inch wallboard substrate. The cement was dried by passing air over the sample at a rate of 300–400 feet per minute for a period of about 24 hours at a relative humidity of between 0–10%.

Result.—No detectable mud cracks, hair-line cracks or lifting (peeling) of cement from the wallboard were noted.

(3) Adhesion to wallboard.—A ⅛ inch wet thickness of cement was deposited on the surface of a 4 x 6 inch wallboard substrate. The cement was dried in a stream of air of between 300–400 feet per minute for a period of 24 hours at a relative humidity of between 0.10%. After drying, a flat-blade knife was inserted between the layer of hardened cement and wallboard and the cement separated therefrom. The amount of hardboard adhering to the cement as well as the degree of delamination of the board's surface was determined.

Result.—Substantial amounts of wallboard adhered to the cements; adhesiveness to the board was graded as being excellent.

(4) Adhesion to wallboard tape.—A ¹⁄₁₆ inch layer of cement was applied to a 4 x 6 inch wallboard substrate. A section of perforated joint tape was then imbedded in the wet cement. A second very thin layer of cement was placed over the tape and smoothed. The cement board was dried for about 24 hours at 75° F. and a relative humidity of 50%. After the cement had completely hardened, the corners of the tape were exposed and lifted with a thin flat-bladed knife. The degree of delamination of either the tape or the board surface indicated the quality of adhesion to the tape.

Result.—Adhesion to the tape was excellent.

(5) Color bleeding.—A circular patty of wet cement approximately ⅛ inch to 3/16 inch in thickness and weighing about 25 grams was placed on a piece of No. 1 whatman filter paper and dried at 75° F. and 50% relative humidity. After the cement patty was completely dried, the patty was broken and the color of the interior portion of the patty was compared with the surface color. Any change in the surface color or discoloration of any area around the filter paper indicated that color bleeding of the cement was present.

Result.—No severe surface discoloration was detected and only a minor color difference was detected on the filter paper. Color bleeding was graded as being negligible.

(6) Sandability (abrasion resistance).—A 45 mil layer of cement was placed on 6 x 4 inch piece of ⅜ inch thick wallboard and dried at 110° F. at a relative humidity of 30% for a period of 24 hours. A strip of S-33 sandpaper was attached to the wheel of a Taber abraser Model 174 manufactured by Taber Instrument Corporation and the cement specimen subjected to the abraser for 25 cycles. A weight loss of 0.25 gm. per 25 cycles indicates good sanding properties.

Result.—An average weight loss of 0.23 gm. was obtained.

Examples 2–8

Example 1 was repeated with the exception that the starch content was varied from 1% to 10%. The characteristic tests reported in Example 1 were repeated for each of the examples. The results of these tests are reported in Table I.

TABLE I

| 1—Example | 2 | 3 | 4 | 5¹ | 6 | 7 | 8 |
|---|---|---|---|---|---|---|---|
| Percent Extruded Oxidized Starch in the Cement | 1.0 | 2.5 | 3.0 | 5.0 | 7.5 | 10.0 | (²) |
| Parts of Water added per 100 parts of Cement | 66 | 66 | 66 | 66 | 66 | 66 | 66 |
| Coded Results: | | | | | | | |
| Application Pot Life | 9 | 9 | 9 | 9 | 9 | 9 | 9 |
| Crack Resistance | 9 | 9 | 8 | 8 | 6 | 2 | 8 |
| Adhesion to Wallboard | 1 | 2 | 5 | 8 | 8 | 9 | 8 |
| Adhesion to Tape | 1 | 2 | 5 | 8 | 8 | 9 | 8 |
| Resistance to Color Bleeding | 9 | 9 | 8 | 8 | 4 | 2 | 7 |
| Sandability | 2 | 5 | 6 | 9 | 5 | 2 | 8 |

¹ Same as Example 1.
² 5% Casein was used in place of the starch.
CODE:
  10–8=Excellent to very good.
  8–6=Very good to good.
  6–4=Good to fair.
  4–2=Fair to poor.
  2–0=Poor to very poor.

The above evaluations were based on cement requirements most requested by wallboard manufacturers, contractors, plasterers, etc.

Examples 9–12

These comparative examples show that a joint cement having a substantially lower viscosity can be obtained by using an oxidized extruded starch as the binder.

A dry joint cement was prepared by blending 7.5 parts of a gelatinized oxidized starch having a carboxyl content of 1.2 weight percent with 92.5 parts of a base mix consisting of:

| | Parts |
|---|---|
| #400 asbestos fiber | 10.0 |
| China clay (kaolin) | 5.0 |
| Surfex (ground limestone) | 74.8 |
| Mica 3X | 10.0 |
| Sodium carbonate (soda ash) | 0.3 |

A second cement was prepared by blending 7.5 grams of casein with the base mix above described.

To 100 grams of each of the above prepared dry cements, 66 ml. of distilled water was added and thoroughly mixed.

The above procedure was repeated except that 86 ml. of distilled water was added. The viscosities for each of the cements were measured and recorded in Table II.

TABLE II

| Ex. | 7.5% Binder Material | Parts Water per 100 Parts Dry Cement | RVF Brookfield Helipath Viscosity in cps. at 77° F., 4 r.p.m., and Bar Type Spindles E or F |
|---|---|---|---|
| 9 | Oxidized Extruded Starch | 66 | 250,000 |
| 10 | Casein | 66 | 1,675,000 |
| 11 | Oxidized Extruded Starch | 86 | 37,000 |
| 12 | Casein | 86 | 675,000 |

The above examples show that a substantially lower cement viscosity may be obtained by using an oxidized extruded starch as the cement binder. This phenomenon is of substantial advantage to the user as less water is required to obtain a cement of low viscosity. It has been found that the use of less water minimizes cracking and/or color bleeding of the dried cement.

Example 13

Example 1 was repeated with the exception that a non-gelatinized oxidized starch was used as the binder in the cement instead of an extruded oxidized starch.

An evaluation of the joint cement indicated that substantial color bleeding and mud cracking occurred.

Example 14

Example 1 was repeated with the exception that an extruded acid-modified (hydrolyzed) starch was used as the binder in the cement instead of the extruded oxidized starch.

An evaluation of the joint cement indicated that the wet cement had a high viscosity and excessive water demand. The extruded acid-modified starches also produced substantial color migration and mud cracking.

Example 15

Example 1 was repeated with the exception that an extruded unmodified corn starch (pearl starch) was used as the binder in the cement instead of an extruded oxidized starch.

An evaluation of the joint cement indicated that the wet cement had a high water demand and caused substantial color migration and mud cracking.

Example 16

Example 1 was repeated with the exception that an extruded hydroxypropyl ether of starch was used as the binder in the cement instead of the extruded oxidized starch.

An evaluation of the joint cement indicated that the wet cement had excessive water demand, color migration and mud cracking.

When the above example was repeated with other derivatized starches including hydroxyethyl ether, carboxy ethyl ether, cyano ethyl ether, and cationic (amino or ammonium alkyl) ether of starch, similar results were obtained.

Examples 17–23

In these examples a comparative study was made with various extruded oxidized starches. The starches differed one from the other by the degree of carboxylation. The carboxyl content of each starch is reported on a percent weight basis. The results of this study are reported in Table III.

TABLE III

| Ex. | Oxidized Extruded Starch, Percent Carboxyl Content | Evaluation Report |
|---|---|---|
| 17 | 0.08 | Slight color bleeding, high water demand, high mud cracking. |
| 18 | 0.34 | Slight color bleeding, slight mud cracking, low water demand. |
| 19 | 0.36 | Do. |
| 20 | 0.54 | No color bleeding, low water demand, good adhesion, mud cracking only under excessive drying conditions. |
| 21 | 0.80 | Slight color bleeding, slight mud cracking, low water demand. |
| 22 | 0.90 | Do. |
| 23 | 1.40 | Excessive color bleeding, high mud cracking, low water demand. |

The carboxyl content was determined by utilizing a modification of the test reported by Eyler et al. in Anol. Chem. 19, 24 (1947). This method is based on the conversion of the sodium salts of starch to the acid form by washing with a nitric acid-methanol solution, removal of excess acid by a methanol-water wash, and drying the sample. Known weights of the dried sample are treated with sodium hydroxide solution and the excess measured by a back titration with hydrochlorine acid using a phenolphthalein indicator.

Example 24

The joint cement was prepared by blending a partially gelatinized oxidized starch having a cold water solubility of about 67 percent with 92.5 grams of a base mix consisting of:

|  | Parts |
|---|---|
| Ground limestone | 60 |
| Mica | 15 |
| Asbestos fiber | 15 |
| Kaolin clay | 10 |

After the above mixture was blended in a Blendette mixer for a period of about 10 minutes, the mixture was transferred to a 400 ml. beaker and 66 ml. of distilled water added. The wet cement had a trowelable Brookfield viscosity of 300,000 at 77° F. and 4 r.p.m.

An evaluation of the above cement indicated that mud cracking was essentially absent. The adhesion to the wallboard and the wallboard tape was excellent. Application pot life was very good. There was no color bleeding and the sandability was measured to be 0.28 grams for the first 25 cycles on a Taber Abrader at 77° F. and a relative humidity of 50%.

It was quite surprising to find that the binding properties exhibited by an oxidized extruded starch could be still further improved by utilizing a partially gelatinized oxidized extruded starch. One would have thought that the ungelatinized starch portion of the binder composition would reduce the cohesive and adhesive strength of the binder.

Since many embodiments of this invention may be made and since many changes may be made in the embodiments described the foregoing is to be interpreted as illustrative only and our invention is defined by the claims appended hereto.

We claim:

1. A binder material comprising between about 51% and 75% of gelatinized oxidized starch material and correspondingly between about 25% and 49% of non-gelatinized ozidized starch material said percentages being based on the total weight of the dry binder material.

2. The binder material of claim 1, wherein the gelatinized oxidized starch material is supplied by an oxidized starch extrudate.

3. The binder material of claim 2, wherein the oxidized starch material and non-gelatinized oxidized starch material hypohalite oxidized.

4. The cement binder of claim 3, wherein the gelatinized oxidized starch and the non-gelatinized oxidized starch material are present in a weight ratio of about 2 to 1.

5. A wallboard joint cement comprising a mixture of a wallboard joint cement filler and a starch binder wherein said starch binder is present in said joint cement in an amount of less than 20% by weight and wherein said starch binder comprises between about 51 and 75% by weight of gelatinized oxidized starch material and between about 25 and 49% by weight of non-gelatinized oxidized starch material.

6. The cement of claim 5 wherein the gelatinized oxidized starch material and the non-gelatinized oxidized starch material are hypohalite oxidized.

7. The cement of claim 6 wherein said gelatinized oxidized starch material and said non-gelatinized oxidized starch material have a carboxyl content of between 0.1 and 4.3% based on the weight of the starch dry substance.

8. The cement of claim 7 wherein the gelatinized oxidized starch material is a supplied by a hypohalite starch extrudate.

9. The cement of claim 8 wherein the oxidized starch extrudate is characterized by a cold water solubility of greater than 50% at 25° C. and a viscosity of less than 50 cps. when 10 parts of said starch extrudate are combined with 90 parts water.

10. The cement of claim 6 wherein the starch binder is present in an amount of between about 1% and 10% based on the weight of the cement and the gelatinized oxidized starch material and the non-gelatinized oxidized starch have a carboxyl content of between 0.2 to 1.3% based on the total weight of the starch dry substance.

References Cited

UNITED STATES PATENTS

| 3,137,592 | 6/1964 | Protzman et al. | 106—210 |
| 2,929,748 | 3/1960 | Schwandt | 127—71 |
| 2,518,359 | 8/1950 | Mohrer | 106—213 |

JULIUS FROME, *Primary Examiner.*

T. MORRIS, *Assistant Examiner.*

UNITED STATES PATENT OFFICE
CERTIFICATE OF CORRECTION

Patent No. 3,411,926                      November 19, 1968

Jack L. Gogek et al.

It is certified that error appears in the above identified patent and that said Letters Patent are hereby corrected as shown below:

Column 6, line 63, "0.10%" should read -- 0-10% --. Column 10, line 15, "material hypohalite" should read -- material are hypohalite --; line 36, "is a supplied by a" should read -- is supplied by a --; line 47, "starch have a" should read -- starch material have a --.

Signed and sealed this 10th day of March 1970.

(SEAL)
Attest:

Edward M. Fletcher, Jr.                   WILLIAM E. SCHUYLER, JR.
Attesting Officer                       Commissioner of Patents